United States Patent
Tang et al.

(10) Patent No.: US 9,519,170 B2
(45) Date of Patent: Dec. 13, 2016

(54) LIQUID CRYSTAL DISPLAY AND THE NARROW BAZEL STRUCTURE THEREOF

(71) Applicant: Shenzhen China Star Optoelectronics Technology Co., Ltd., Shenzhen, Guangdong (CN)

(72) Inventors: Guofu Tang, Shenzhen (CN); Dehua Li, Shenzhen (CN)

(73) Assignee: Shenzhen China Star Optoelectronics Technology Co., Ltd, Shenzhen, Guangdon (CN)

( * ) Notice: Subject to any disclaimer, the term of this patent is extended or adjusted under 35 U.S.C. 154(b) by 179 days.

(21) Appl. No.: 13/981,655

(22) PCT Filed: Jun. 24, 2013

(86) PCT No.: PCT/CN2013/077795
§ 371 (c)(1),
(2) Date: Jul. 25, 2013

(87) PCT Pub. No.: WO2014/172984
PCT Pub. Date: Oct. 30, 2014

(65) Prior Publication Data
US 2014/0320778 A1 Oct. 30, 2014

(30) Foreign Application Priority Data

Apr. 24, 2013 (CN) .......................... 2013 1 0145088

(51) Int. Cl.
*G02F 1/1333* (2006.01)
(52) U.S. Cl.
CPC .................... *G02F 1/133308* (2013.01); *G02F 2001/13332* (2013.01); *G02F 2001/133314* (2013.01);
(Continued)

(58) Field of Classification Search
CPC .............. G02F 1/133308; G02F 2001/133314; G02F 2001/133317; G02F 2001/133322
(Continued)

(56) References Cited

U.S. PATENT DOCUMENTS

| 8,319,910 B2* | 11/2012 | Park | G02F 1/133308 |
| | | | 349/58 |
| 2004/0257490 A1* | 12/2004 | Ho | G02F 1/133308 |
| | | | 349/58 |

(Continued)

FOREIGN PATENT DOCUMENTS

| CN | 102809836 A | 12/2012 |
| CN | 102819130 A | 12/2012 |
| CN | 102819131 A | 12/2012 |

*Primary Examiner* — Dung Nguyen
(74) *Attorney, Agent, or Firm* — Andrew C. Cheng

(57) ABSTRACT

A narrow bezel structure of a liquid crystal display is disclosed. The bezel structure includes a middle frame having a side wall and a horizontal wall connecting to the side wall. The side wall includes a front sidewall and a rear sidewall defines by the horizontal wall. A liquid crystal module of the LCD is fixed on the horizontal wall. The edge of the liquid crystal module corresponds to an internal side of the front sidewall. The rear sidewall is assembled with a back frame of the LCD, and a backlight module of the LCD is fixed on the back frame. In addition, the LCD incorporates the above narrow bezel structure is also disclosed. With the simple bezel structure, not only the front frame of the middle frame is prevented from bending outward, but also a plurality of industrial designs can be achieved.

6 Claims, 3 Drawing Sheets

(52) U.S. Cl.
CPC ............ *G02F 2001/133317* (2013.01); *G02F 2001/133322* (2013.01); *G02F 2201/503* (2013.01)

(58) Field of Classification Search
USPC ...................................................... 349/58–60
See application file for complete search history.

(56) References Cited

U.S. PATENT DOCUMENTS

| | | | |
|---|---|---|---|
| 2009/0225252 A1* | 9/2009 | Jeong ................ | G02F 1/133308 349/58 |
| 2009/0268121 A1* | 10/2009 | Hisada ............................ | 349/58 |
| 2011/0157512 A1* | 6/2011 | Mishima ......................... | 349/58 |
| 2013/0300974 A1* | 11/2013 | Yoshimoto ...................... | 349/58 |
| 2014/0009716 A1* | 1/2014 | Tang ............................... | 349/58 |

* cited by examiner

LIQUID CRYSTAL DISPLAY AND THE NARROW BAZEL STRUCTURE THEREOF

BACKGROUND OF THE INVENTION

1. Field of the Invention

Embodiments of the present disclosure relate to liquid crystal display (LCD) technology, and more particularly to a narrow bezel structure of LCDs.

2. Discussion of the Related Art

Nowadays, narrow bezel structure has become a trend for LCDs. Generally, the LCD includes a front frame for abutting against a liquid crystal module so as to prevent the liquid crystal module from being detached. Edge-wrapped design, which relates to wrapping the display module by a lateral housing, is generally adopted by such narrow bezel LCDs. The technical evolution contributes to the current trend of frameless design. FIG. 1 is a schematic view of the frameless structure of one conventional LCD. It can be understood that with such structure, edges of the liquid crystal module 1 exposes outward. With the fragile attribute of the glasses, the display performance may be affected while the edges of the liquid crystal module are fragmented. One solution is to coating adhesive seal 2 on the edges of the liquid crystal module 1. The adhesive seal 2 may be silicone or epoxy resin. The elastic attribute of the adhesive seal 2 provides a buffering effect to prevent the edges from being fragmented. However, the coating process is troublesome. In addition, the adhesive seal 2 may not be fixed enough while the edges of the glasses are not smooth.

As the glass of the display module is arranged outmost, the only solution is to wrap the glass with the lateral housing 3, which results in industrial design constraints. Furthermore, the edge-wrapping solution may cause the housing to bend outward. In addition, the gap D1 between the lateral housing 3 and the liquid crystal module is detrimental to the narrow bezel design.

SUMMARY

In one aspect, a narrow bezel structure of a liquid crystal display (LCD) includes: a middle frame includes a side wall and a horizontal wall connecting to the side wall, the side wall includes a front sidewall and a rear sidewall defines by the horizontal wall, wherein a liquid crystal module of the LCD is fixed on the horizontal wall, the edge of the liquid crystal module corresponds to an internal side of the front sidewall, the rear sidewall is assembled with a back frame of the LCD, and a backlight module of the LCD is fixed on the back frame.

Wherein the rear sidewall sinks inward into the LCD to cooperatively form a step-like portion with the front sidewall.

Wherein the narrow bezel structure further includes a lateral outer frame, the lateral outer frame includes a lateral frame and a bottom frame vertical to the lateral frame, the lateral frame and the bottom frame are integrally formed, the lateral frame connects to the step-like portion of the side wall, and the bottom frame is fixed on the back frame.

Wherein an outer surface of the lateral outer frame and an outer surface of the front sidewall are on the same plane.

Wherein a thickness of the side wall is of the range between 0.4 mm and 2 mm.

Wherein the step-like portion further includes a recess arranged between the outer surface of the rear sidewall and that of the front sidewall.

Wherein the lateral outer frame includes a flange corresponding to the recess.

Wherein the step-like portion further includes a recess arranged between the outer surface of the rear sidewall and that of the front sidewall, and the middle frame further includes a latch extending along an opposite direction with the front sidewall, and the lateral outer frame includes a slot corresponding to the latch, and the slot is arranged on one edge of the lateral outer frame.

Wherein herein the narrow bezel structure further includes a lateral outer frame, the lateral outer frame includes a lateral frame and a bottom frame vertical to the lateral frame, the lateral frame and the bottom frame are integrally formed, the lateral frame is adhered to an outer surface of the middle frame, and the bottom frame is fixed on the back frame.

In another aspect, a liquid crystal display (LCD) includes: a display module comprising a liquid crystal module and a backlight module; a back frame; and a narrow bezel structure comprising a middle frame, the middle frame includes a side wall and a horizontal wall connecting to the side wall, the side wall includes a front sidewall and a rear sidewall defines by the horizontal wall, wherein the liquid crystal module of the LCD is fixed on the horizontal wall, the edge of the liquid crystal module corresponds to an internal side of the front sidewall, the rear sidewall is assembled with the back frame of the LCD, and the backlight module of the LCD is fixed on the back frame.

Wherein the rear sidewall sinks inward into the LCD to cooperatively form a step-like portion with the front sidewall.

Wherein the narrow bezel structure further includes a lateral outer frame, the lateral outer frame includes a lateral frame and a bottom frame vertical to the lateral frame, the lateral frame and the bottom frame are integrally formed, the lateral frame connects to the step-like portion of the side wall, and the bottom frame is fixed on the back frame.

Wherein an outer surface of the lateral outer frame and an outer surface of the front sidewall are on the same plane.

Wherein a thickness of the side wall is of the range between 0.4 mm and 2 mm.

Wherein the step-like portion further includes a recess arranged between the outer surface of the rear sidewall and that of the front sidewall.

Wherein the lateral outer frame includes a flange corresponding to the recess.

Wherein the step-like portion further includes a recess arranged between the outer surface of the rear sidewall and that of the front sidewall, and the middle frame further includes a latch extending along an opposite direction with the front sidewall, and the lateral outer frame includes a slot corresponding to the latch, and the slot is arranged on one edge of the lateral outer frame.

Wherein herein the bezel structure further includes a lateral outer frame, the lateral outer frame includes a lateral frame and a bottom frame vertical to the lateral frame, the lateral frame and the bottom frame are integrally formed, the lateral frame is adhered to an outer surface of the middle frame, and the bottom frame is fixed on the back frame.

The narrow bezel structure of the claimed invention not only may be assembled in an efficient way, but also can prevent the front sidewall from being deformed. As such, the glass is prevented from being fragmented, and a plurality of industrial designs can be achieved at the same time.

DETAILED DESCRIPTION OF THE EMBODIMENTS

Embodiments of the invention will now be described more fully hereinafter with reference to the accompanying drawings, in which embodiments of the invention are shown.

Figure 1:
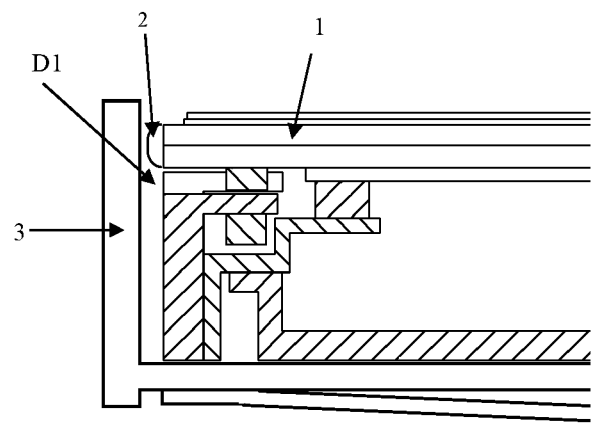
FIG. 1 is a schematic view of the narrow bezel structure of a conventional liquid crystal device.
Figure 2:
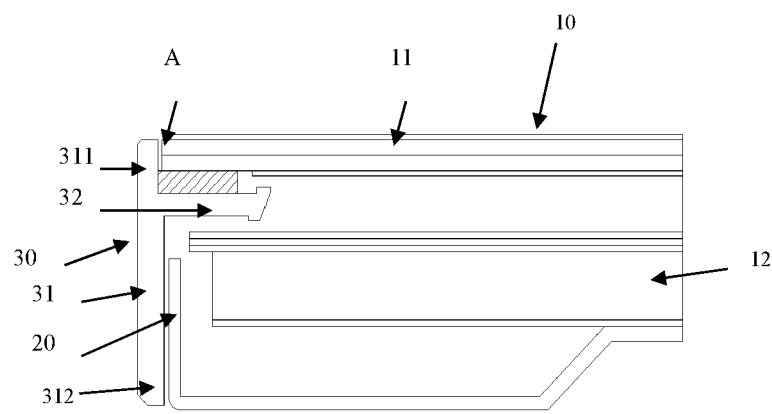
FIG. 2 is a schematic view of the narrow bezel structure of a liquid crystal device in accordance with a first embodiment.

FIG. 2 is a schematic view of the narrow bezel structure of the LCD in accordance with a first embodiment. The LCD includes a display module 10 and a back frame 20. The display module 10 includes a liquid crystal module 11, a backlight module 12, and a middle frame 30. The middle frame 30 includes a side wall 31 and a horizontal wall 32 connecting to the side wall 31 to form a substantially T-shaped structure. The side wall 31 includes a front sidewall 311 and a rear sidewall 312 defines by the horizontal wall 32. As shown, the liquid crystal module 11 is fixed on the horizontal wall 32. The edge of the liquid crystal module 11 corresponds to an internal side of the front sidewall 311. In one embodiment, as shown in FIG. 1, the adhesive seal (not shown) may be applied to the edge of the liquid crystal module 11, as indicated by "A". The liquid crystal module 11 connects to the horizontal wall 32 of the middle frame 30 by arranging a double-sided foaming adhesive between a down glass substrate 13 and the horizontal wall 32 of the middle frame 30. As the down glass substrate 13 and the middle frame 30 have different inflation rate, the down glass substrate 13 and the middle frame 30 may detach from each other. This issue can be solved by utilizing the attributes, i.e., the thickness and the hardness, of the double-sided foaming adhesive. In one embodiment, a plastic member is arranged below the down glass substrate. The plastic member is fixed with the back frame so as to assemble the liquid crystal module and the middle frame. After assembling the rear sidewall 312 and the back frame 20 by screws or the adhesive seal, the backlight module 12 is fixed on the back frame 20.

To provide a better strength, the middle frame 30 may be made by plastic material or by metallic material using casting or extrusion process. Preferably, the thickness of the side wall 31 is of the range between 0.4 mm and 2 mm. In the embodiment, the middle frame 30 is made by plastic material, and the thickness is 2 mm.

The front sidewall 311 of the middle frame 30 is a little bit higher than an up surface of the liquid crystal module 11. When a vertical force is applied to the glass substrate. i.e., the LCD is tilted or put downward, the front sidewall 311 is subject to the vertical force, and the vertical force is then transmitted to the back frame 20 such that the glass substrate is prevented from being fragmented.

Compared to the above structure, the conventional structure also includes lateral housing in the front frame and in the periphery. As such, the narrow bezel structure of the claimed invention requires less material and thus reduces the cost.

Figure 3:
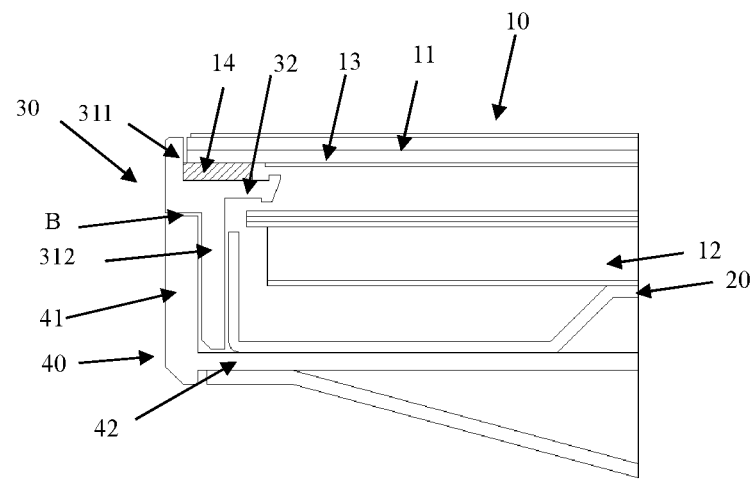
FIG. 3 is a schematic view of the narrow bezel structure of a liquid crystal device in accordance with a second embodiment.

FIG. 3 is a schematic view of the narrow bezel structure of the liquid crystal device in accordance with a second embodiment. The side wall 31 of the middle frame 30 includes a front sidewall 311 and a rear sidewall 312 that are integrally formed. The rear sidewall 312 sinks inward into the LCD to cooperatively form a step-like structure with the front sidewall 311. In addition, the narrow bezel structure also includes a lateral outer frame 40 having a lateral frame 41 and a bottom frame 42 vertical to the lateral frame 41. The lateral frame and the bottom frame are integrally formed. The lateral frame 41 connects to the step-like portion of the side wall 31, and the bottom frame 42 is fixed on the back frame 20 by screws or rivets. In the embodiment, an outer surface of the lateral outer frame 40 and that of the front sidewall 311 is on the same plane. When the front sidewall 311 is bent outward, the step-like portion may be bent and the force is applied to the edge, as indicated by "B" in FIG. 3, of the lateral outer frame 40. When the lateral outer frame 40 is assembled with the back frame 20, an opposite force is generated to cause the front sidewall 311 to be in the original state. As such, the front sidewall 311 is prevented from bending outward. In the embodiment, the middle frame 30 is made by metallic material, and the thickness of the side wall 31 is 0.4 mm.

Figure 4:
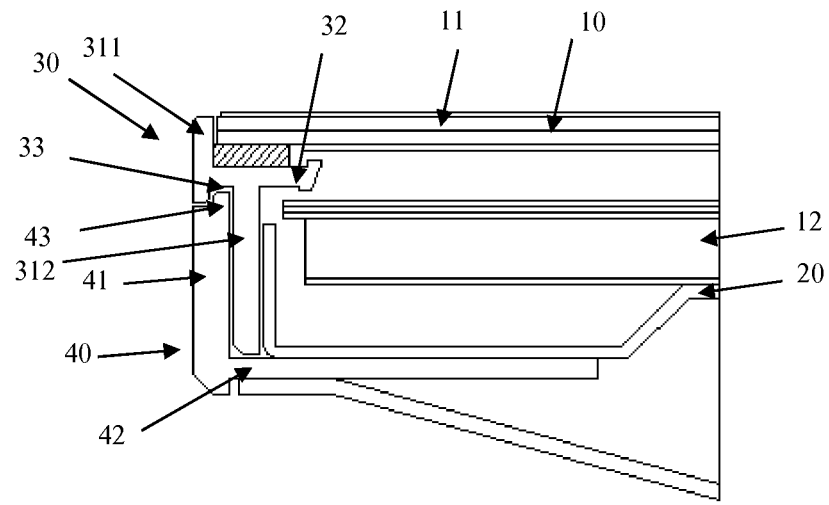
FIG. 4 is a schematic view of the narrow bezel structure of a liquid crystal device in accordance with a third embodiment.

FIG. 4 is a schematic view of the narrow bezel structure of the liquid crystal device in accordance with a third embodiment. As shown, the step-like portion of the middle frame 30 further includes a recess 33 arranged between the outer surface of the rear sidewall 312 and that of the front sidewall 311. The edge of the lateral outer frame 40 includes a corresponding flange. The recess 33 and the flange contribute to the connection between the lateral outer frame 40 and the middle frame 30. In addition, the front sidewall 311 is also prevented from bending outward.

Figure 5:
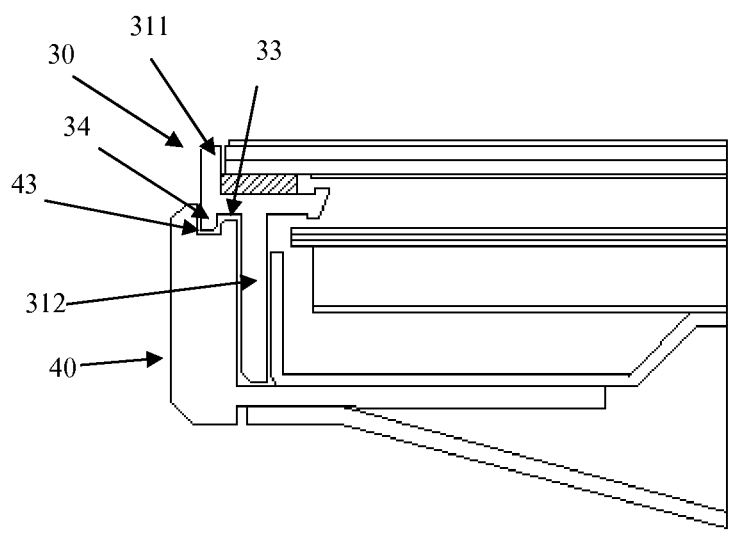
FIG. 5 is a schematic view of the narrow bezel structure of a liquid crystal device in accordance with a fourth embodiment.

FIG. 5 is a schematic view of the narrow bezel structure of a liquid crystal device in accordance with a fourth embodiment. In the embodiment, the structure of the lateral outer frame 40 is different from that in the third embodiment. The step-like portion of the middle frame 30 includes a recess 33 arranged between the outer surface of the rear sidewall 312 and that of the front sidewall 311. In addition, the middle frame 30 further includes a latch 34 extending along an opposite direction with the front sidewall 311. In the embodiment, the thickness of the lateral outer frame 40 is larger than the height of the step-like portion of the middle frame 30. The lateral outer frame 40 includes a slot 43 corresponding to the latch 34, and the slot 43 is arranged on one edge of the lateral outer frame 40. The latch 34 engages with the slot 43 to further strengthen the connection between the middle frame 30 and the lateral outer frame 40. To provide a visual difference between the middle frame 30 and the lateral outer frame 40, surface processes, such as oxidation or wine drawing, may be applied to the lateral outer frame 40. In the embodiment, the lateral outer frame 40 is made by aluminum to contribute to the surface processes. The middle frame 30 is made by plastic material with injection molding.

Figure 6:
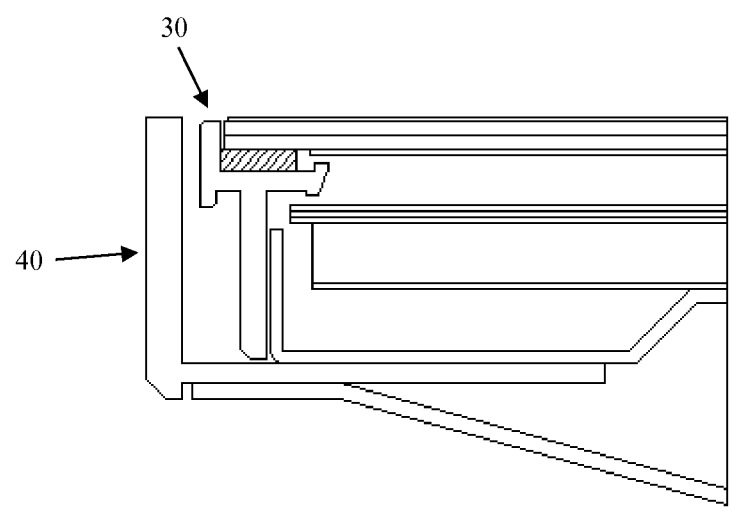
FIG. 6 is a schematic view of the narrow bezel structure of a liquid crystal device in accordance with a fifth embodiment.

FIG. 6 is a schematic view of the narrow bezel structure of a liquid crystal device in accordance with a fifth embodiment. As shown, the narrow bezel structure includes the middle frame 30 and the lateral outer frame 40. It can be seen that the middle frame 30 and the lateral outer frame 40 are not closely connected. The lateral outer frame 40 totally wraps the middle frame 30, and it can be understood that such structure may not be considered as the narrow bezel design. However, the same molding may be adopted to accomplish such structure, and also a plurality of industrial design may be achieved by such structure. Furthermore, the bezel structure is still narrower than conventional LCD having one front frame.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A narrow bezel structure of a liquid crystal display (LCD), comprising:
    a middle frame comprises a side wall and a horizontal wall connecting to the side wall, the side wall comprises a front sidewall and a rear sidewall defines by the horizontal wall, wherein a liquid crystal module of the LCD is fixed on the horizontal wall, the edge of the liquid crystal module corresponds to an internal side of the front sidewall, the rear sidewall is assembled with a back frame of the LCD, and a backlight module of the LCD is fixed on the back frame;
    wherein the rear sidewall sinks inward into the LCD to cooperatively form a step-like portion with the front sidewall;
    wherein the narrow bezel structure further comprises a lateral outer frame, the lateral outer frame comprises a lateral frame and a bottom frame vertical to the lateral frame, the lateral frame and the bottom frame are integrally formed, the lateral frame connects to the step-like portion of the side wall, and the bottom frame is fixed on the back frame;
    wherein the liquid crystal module connects to the horizontal wall of the middle frame by arranging a double-sided forming adhesive between a down glass substrate and the horizontal wall of the middle frame;
    wherein a thickness of the lateral outer frame is larger than a height of the step-like portion of the middle frame along a horizontal direction; and
    wherein the middle frame further comprises a latch extending along an opposite direction with the front sidewall, and the lateral outer frame comprises a slot corresponding to the latch, and the slot is arranged on one edge of the lateral outer frame.

2. The narrow bezel structure as claimed in claim 1, wherein a thickness of the side wall is of the range between 0.4 mm and 2 mm.

3. The narrow bezel structure as claimed in claim 1, wherein the step-like portion further comprises a recess arranged between the outer surface of the rear sidewall and that of the front sidewall.

4. A liquid crystal display (LCD), comprising:
    a display module comprising a liquid crystal module and a backlight module;
    a back frame; and
    a narrow bezel structure comprising a middle frame, the middle frame comprises a side wall and a horizontal wall connecting to the side wall, the side wall comprises a front sidewall and a rear sidewall defines by the horizontal wall, wherein the liquid crystal module of the LCD is fixed on the horizontal wall, the edge of the liquid crystal module corresponds to an internal side of the front sidewall, the rear sidewall is assembled with the back frame of the LCD, and the backlight module of the LCD is fixed on the back frame;
    wherein the rear sidewall sinks inward into the LCD to cooperatively form a step-like portion with the front sidewall;
    wherein the narrow bezel structure further comprises a lateral outer frame, the lateral outer frame comprises a lateral frame and a bottom frame vertical to the lateral frame, the lateral frame and the bottom frame are integrally formed, the lateral frame connects to the step-like portion of the side wall, and the bottom frame is fixed on the back frame;
    wherein the liquid crystal module connects to the horizontal wall of the middle frame by arranging a double-sided forming adhesive between a down glass substrate and the horizontal wall of the middle frame;
    wherein a thickness of the lateral outer frame is larger than a height of the step-like portion of the middle frame along a horizontal direction; and
    wherein the middle frame further comprises a latch extending along an opposite direction with the front sidewall, and the lateral outer frame comprises a slot corresponding to the latch, and the slot is arranged on one edge of the lateral outer frame.

5. The LCD as claimed in claim 4, wherein a thickness of the side wall is of the range between 0.4 mm and 2 mm.

6. The LCD as claimed in claim 4, wherein the step-like portion further comprises a recess arranged between the outer surface of the rear sidewall and that of the front sidewall.

* * * * *